(12) United States Patent
Terada et al.

(10) Patent No.: US 8,057,956 B2
(45) Date of Patent: Nov. 15, 2011

(54) FUEL CELL WITH FUEL ADJUSTING FILM

(75) Inventors: Takahiro Terada, Yokohama (JP);
Yasutada Nakagawa, Yokohama (JP);
Shinji Nakata, Yokohama (JP); Yuuichi Yoshida, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1081 days.

(21) Appl. No.: 11/297,378

(22) Filed: Dec. 9, 2005

(65) Prior Publication Data

US 2006/0127707 A1    Jun. 15, 2006

(30) Foreign Application Priority Data

Dec. 13, 2004 (JP) ................................ 2004-360206
Jun. 24, 2005 (JP) ................................ 2005-185092

(51) Int. Cl.
*H01M 8/04* (2006.01)
(52) U.S. Cl. ........ 429/513; 429/456; 429/457; 429/443; 429/447
(58) Field of Classification Search .................. None
See application file for complete search history.

(56) References Cited

U.S. PATENT DOCUMENTS 6,447,941 B1 *   9/2002   Tomimatsu et al. ............ 429/26
2001/0051293 A1  12/2001  Narayanan et al.
2003/0077501 A1   4/2003  Knights et al.
2004/0136156 A1   7/2004  Nakamura et al.

FOREIGN PATENT DOCUMENTS

| DE | 198 53 911 A1 | 5/2000 |
|---|---|---|
| EP | 0 440 968 A1 | 8/1991 |
| JP | 7-52652 | 10/1987 |
| JP | 1-258365 | 10/1989 |
| JP | 2000-106201 | 4/2000 |
| JP | 2002-110191 | 4/2002 |
| JP | 2002110191 A * | 4/2002 |
| JP | 2003-68325 | 3/2003 |
| JP | 2003068325 A * | 3/2003 |
| JP | 2004-220594 | 8/2004 |

* cited by examiner

*Primary Examiner* — Keith Walker
(74) *Attorney, Agent, or Firm* — Oblon, Spivak, McClelland, Maier & Neustadt, L.L.P.

(57) ABSTRACT

A fuel cell includes electromotive portions, a first sheet, a second sheet, a replenishing portion and a fuel adjusting film. The electromotive portions cause fuel and oxygen to react chemically with each other to produce electrical energy. The first sheet is provided to supply the fuel to the electromotive portions. The second sheet is provided to supply the oxygen to the electromotive portions. The replenishing portion is provided at a predetermined portion of the first sheet to replenish the first sheet with the fuel. The fuel adjusting film is inserted in the first sheet to adjust the amounts of the fuel to be supplied from the first sheet to the electromotive portions.

3 Claims, 8 Drawing Sheets

FUEL CELL WITH FUEL ADJUSTING FILM

CROSS-REFERENCE TO RELATED APPLICATIONS

This application is based upon and claims the benefit of priority from prior Japanese Patent Applications No. 2004-360206, filed Dec. 13, 2004; and No. 2005-185092, filed Jun. 24, 2005, the entire contents of all of which are incorporated herein by reference.

BACKGROUND OF THE INVENTION

1. Field of the Invention

The present invention relates to a direct type fuel cell in which fuel and air are made to react chemically with each other to produce electrical energy.

2. Description of the Related Art

It is well known that there are provided fuel cells in which fuel and air are made to react chemically with each other to produce electrical energy. Of those fuel cells, a direct type fuel cell can be made smaller, and is expected to serve as an energy source for a portable electronic device such as a cellular phone or a notebook computer.

Figure 13:
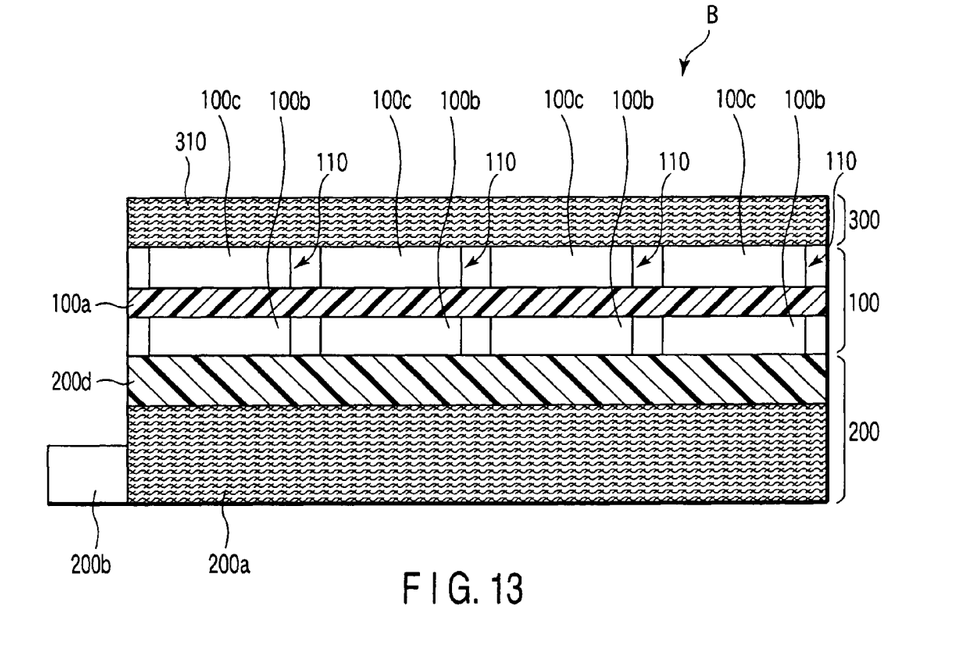
FIG. 13 is a vertical sectional view of a conventional fuel cell.

FIG. 13 is a vertical sectional view of a conventional fuel cell B.

As shown in FIG. 13, the conventional fuel cell B comprises an electromotive layer 100, a fuel supplying layer 200 and an air supplying layer 300. The electromotive layer 100 is provided to produce electrical energy. The fuel supplying layer 200 is provided on a surface of the electromotive layer 100 to supply fuel to the electromotive layer 100. The air supplying layer 300 is provided on another surface of the electromotive layer 100, which is located opposite to the above surface, to supply air (oxygen) to the electromotive layer 100.

The electromotive layer 100 comprises an electrolyte membrane 100a, a plurality of fuel poles 110b, and a plurality of oxidizer poles 100c. In the electrolyte membrane 100a, fuel and air are made to react chemically with each other. The fuel poles 100b are arranged in a matrix on a surface of the electrolyte membrane 100a, which is close to the fuel supplying layer 200, and supply fuel from the fuel supplying layer 200 to the electrolyte membrane 100a. The oxidizer poles 100c are arranged in a matrix on another surface of the electrolyte membrane 100a, which is located opposite to the above surface and close to the air supplying layer 300 of the electrolyte membrane 100a, and supply air from the air supplying layer 300 to the electrolyte membrane 100a.

The fuel poles 100b and the oxidizer poles 100c are located opposite to each other, with the electrolyte membrane 100a interposed between them. The fuel poles 100b, the oxidizer poles 100c and the electrolyte membrane 100a form respective electromotive portions 110 for generating voltages. That is, the electromotive layer 100 comprises the electromotive portions 110 the number of which is equal to each of that of the fuel poles 110b and that of the oxidizer poles 100c. The electromotive portions 110 are all connected in series to each other. The sum of the voltages produced by the electromotive portions 110 is the final output voltage of the fuel cell B.

The fuel supplying layer 200 comprises a felted liquid holding sheet 200a for supplying fuel to the fuel poles 100b, a replenishing portion 200b connected to the liquid holding sheet 200a, for replenishing the liquid holding sheet 200a with fuel, and a fuel diffusion film 200d which permits the fuel in the liquid holding sheet 200a to pass through the fuel diffusion film 200d, and which is provided on a surface of the liquid holding sheet 200a, which is close to the electromotive portions 110.

The air supplying layer 300 comprises a felted moisture-retentive sheet 310 which takes therein air from the vicinity of the fuel cell B, and then supplies it to the oxidizer poles 100c, and which prevents releasing moisture which is produced in the electrolyte membrane 100a due to chemical reaction of fuel and air, i.e., prevents drying of the electrolyte membrane 100a.

In the fuel cell B having the above structure, fuel with which the liquid holding sheet 200a is replenished from the replenishing portion 200b is advanced within the liquid holding sheet 200a toward the fuel diffusion layer 200d, while diffusing in a direction away from the replenishing portion 200b. It then reaches the fuel poles 100b on the fuel diffusion film 200d.

On the other hand, air taken in the moisture-retentive sheet 310 from the vicinity of the fuel cell B passes through the moisture-retentive sheet 310, and reaches the oxidizer poles 100c on the moisture-retentive sheet 310.

Then, the fuel reaching the fuel poles 100b and the air reaching the oxidizer poles 100c react chemically with each other at the electrolyte membrane 100a, causing voltages to be produced between the fuel poles 100b and the oxidizer poles 100c. The sum of voltages produced at the electromotive portions 110 is the final output voltage of the fuel cell B.

Furthermore, in a direct type fuel cell disclosed in, e.g., Jpn. Pat. Appln. KOKAI Publication No. 2000-106201, a plurality of electromotive layers are stacked together, and liquid fuel is supplied to the electromotive layers by capillary action.

In most conventional fuel cells, the replenishing portion is provided at an end of the liquid holding sheet since the replenishing portion is restricted by the structure of the cell. In such a structure, there is a case where the concentration of the fuel in the liquid holding sheet is not uniform, i.e., the concentration varies from one part of the liquid holding sheet to another. In this case, the concentrations of fuel reaching the electromotive portions are also different, thus worsening the efficiency of production of electrical energy by the electromotive portions.

For example, if a large amount of fuel is supplied to the electromotive portions, surplus fuel which has not reacted in the electrolyte membrane reaches the oxidizer poles. Thus, it is wasteful, and in addition the voltage loss may increase due to reduction of the surface areas of catalysts included in the oxidizer poles. On the other hand, if an excessively small amount of fuel is supplied to the electromotive portions, the reaction energy becomes too large, as a result of which the voltage loss may also increase.

Thus, in order to improve the electrical characteristics of the fuel cell, it is important to make the concentration of fuel in the entire liquid holding sheet uniform, and supply a proper amount of fuel to the electromotive portions. However, in a portable electronic device required to operate for a long time, a fuel cell including a large liquid holding sheet is provided, and the concentration of fuel therein greatly varies from one part to another. Therefore, as is often the case, the amount of fuel supplied to each electromotive portion is too large or small, thus remarkably worsening the electrical characteristics.

BRIEF SUMMARY OF THE INVENTION

The object of the present invention is to provide a fuel cell having satisfactory electrical characteristics.

A fuel cell according to one aspect of the present invention comprises: a plurality of electromotive portions which cause fuel and oxygen to react chemically with each other to produce electrical energy; a first sheet which supplies the fuel to the plurality of electromotive portions; a second sheet which supplies the oxygen to the plurality of electromotive portions; a replenishing portion which is provided at a predetermined portion of the first sheet, and replenishes the first sheet with the fuel; and a fuel adjusting film which is inserted in the first sheet, and adjusts amounts of the fuel to be supplied from the first sheet to the plurality of electromotive portions.

A fuel cell according to another aspect of the present invention comprises: a plurality of electromotive portions which cause fuel and oxygen to react chemically with each other to produce electrical energy; a first sheet which supplies the fuel to the plurality of electromotive portions; a second sheet which supplies the oxygen to the plurality of electromotive portions; a replenishing portion which is provided at a predetermined portion of the first sheet, and replenishes the first sheet with the fuel; and a fuel diffusion film which is provided between the plurality of electromotive portions and the first sheet, and permits the fuel from the first sheet to pass through the fuel diffusion film, the fuel diffusion film adjusting amounts of the fuel to be supplied from the first sheet to the plurality of electromotive portions.

A fuel cell according to a further aspect of the present invention comprises: a plurality of electromotive portions which are arranged in a direction crossing a horizontal direction, and cause fuel and oxygen to react chemically with each other to produce electrical energy; a first sheet which supplies the fuel to the electromotive portions; a second sheet which supplies the oxygen to the electromotive portions; a replenishing portion which is provided at a predetermined portion of the first sheet, and replenishes the first sheet with the fuel; and a fuel adjusting film which is provided to extend along the direction in which the electromotive portions are arranged, and adjusts amounts of the fuel to be supplied from the first sheet to the electromotive portions.

A fuel cell according to still another aspect of the present invention comprises: a plurality of electromotive portions which are arranged in a direction crossing a horizontal direction, and cause fuel and oxygen to react chemically with each other to produce electrical energy; a first sheet which supplies the fuel to the electromotive portions; a second sheet which supplies the oxygen to the electromotive portions; a replenishing portion which is provided at a predetermined portion of the first sheet, and replenishes the first sheet with the fuel; and a fuel diffusion film which is provided between the electromotive portions and the first sheet to extend along the direction in which the electromotive portions are arranged, and permits the fuel supplied from the first sheet to pass through the fuel diffusion film, the fuel diffusion film adjusting amounts of the fuel to be supplied from the first sheet to the electromotive portions.

According to the present invention, the electrical characteristics of the fuel cell are improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

The first embodiment of the present invention will be explained with reference to FIGS. 1 to 3 and 12A to 12D.

Figure 1:
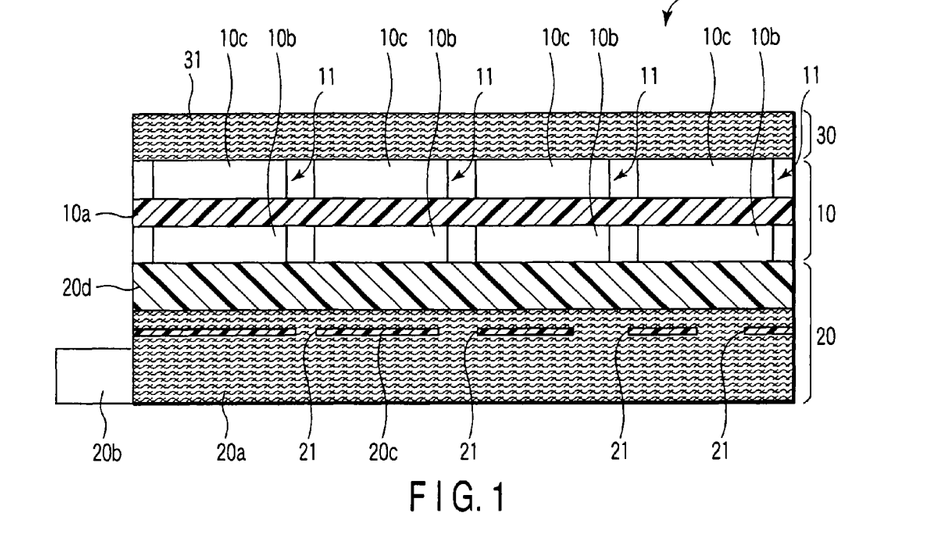
FIG. 1 is a schematic view of a fuel cell according to a first embodiment of the present invention.

FIG. 1 is a schematic view of a fuel cell A according to a first embodiment of the present invention.

As shown in FIG. 1, the fuel cell A comprises an electromotive layer 10, a fuel supplying layer 20 and an air supplying layer 30. The electromotive layer 10 is provided to produce electrical energy. The fuel supplying layer 20 is provided on a surface of the electromotive layer 10 to supply fuel to the electromotive layer 10. The air supplying layer 30 is provided on another surface of the electromotive layer 10, which is located opposite to the above surface, to supply air (oxygen) to the electromotive layer 10. As the above fuel, a liquid fuel having volatility such as methanol is used.

The electromotive layer 10 comprises an electrolyte membrane 10a, a plurality of fuel poles 10b and a plurality of oxidizer poles 10c. In the electrolyte membrane 10a, fuel and air are made to react chemically with each other. The fuel poles 10b are arranged on a surface of the electrolyte membrane 10a, which is close to the fuel supplying layer 20, for supplying fuel from the fuel supplying layer 20 to the electrolyte membrane 10a. The oxidizer poles 10c are arranged on the other side of the electrolyte membrane 10a, which is closer to the air supplying layer 30, for supplying air from the air supplying layer 30 to the electrolyte membrane 10a.

The fuel poles 10b and the oxidizer poles 10c are located opposite to each other, with the electrolyte membrane 10a interposed between them. The fuel poles 10b, the oxidizer poles 10c and the electrolyte membrane 10a form respective electromotive portions 11 for generating voltages. That is, the electromotive layer 10 comprises the electromotive portions 11 the number of which is equal to each of that of the fuel poles 10b and that of the oxidizer poles 10c. It should be noted that the electromotive portions 11 are all connected in series to each other, and the sum of voltages produced by the electromotive portions 11 is the final output voltage of the fuel cell A.

The fuel supplying layer 20 comprises a felted liquid holding sheet (first sheet) 20a, a replenishing portion 20b, a fuel adjusting film 20c (which will be described later in detail), and a fuel diffusion film 20d. The felted liquid holding sheet 20a is provided to supply fuel to the fuel poles 10b. The replenishing portion 20b is connected to a side end portion of the liquid holding sheet 20a to replenish the liquid holding sheet 20a with fuel. The fuel adjusting film 20c is provided in the liquid holding sheet 20a to isolate the replenishing portion 20b and the electromotive portions 11 from each other, and to uniformize the amounts of fuel supplied from the liquid holding sheet 20a to the electromotive portions 11. The fuel diffusion film 20d is provided on a surface of the liquid holding sheet 20a, which is close to the electromotive portions 11, and permits fuel in the liquid holding sheet 20a to pass through the fuel diffusion film 20d.

The air supplying layer 30 comprises a felted moisture-retentive sheet (second sheet) 31 which takes therein air from its vicinity, and then supplies it to the oxidizer poles 10c, and which prevents releasing of moisture which is produced in the electrolyte membrane 10a due to chemical reaction of fuel and air, i.e., prevents drying of the electrolyte membrane 10a.

Next, the fuel adjusting film 20c will be explained.

In the first embodiment, the fuel adjusting film 20c is formed of a so-called impervious film which does not permit fuel to pass therethrough. As the impervious film, for example, a PET film is used. The fuel adjusting film 20c includes a plurality of openings 21 for enabling fuel, with which the liquid holding sheet 20a is replenished, to advance toward the electromotive portions 11.

The openings 21 have different sizes, and are arranged in ascending order of size from the ones closest the replenishing portion 20b. Thereby, the further the fuel in the liquid holding sheet 20a is located from the replenishing portion 20b, the more easily it advances toward the electromotive portions 11.

Therefore, fuel with which the liquid holding sheet 20a is replenished from the replenishing portion 20b is supplied to the electromotive portions 11 such that the amounts of the fuel at the electromotive portions 11 are made uniform, regardless of the distances between the electromotive portions 11 and the replenishing portion 20.

In the first embodiment, the openings 21 are rectangular. However, their shape is not limited to a rectangle. For example, they may be circular. Furthermore, the openings 21 may be formed in the following manner: the openings 21 are formed to have the same size, and the distances between the openings 21 are adjusted such that the further the fuel is located from the replenishing portion 20b, the more easily it advances toward the electromotive portion side.

In the fuel cell A having the above structure, fuel with which the liquid holding sheet 20a is replenished from the replenishing portion 20b is diffused within the liquid holding sheet 20a in a direction away from the replenishing portion 20b, and advances toward the electromotive layer 10 through the openings 21 of the fuel adjusting film 20c. Then, after entering the fuel diffusion film 20d, the fuel passes through the fuel diffusion film 20d, and reaches the fuel poles 10b of the electromotive portions 11.

On the other hand, air taken in the moisture-retentive sheet 31 from the vicinity of the fuel cell A diffuses in the moisture-retentive sheet 31, and reaches the oxidizer poles 10c of the electromotive portions 11.

Thereafter, the fuel reaching the fuel poles 10b and the air reaching the oxidizer poles 10c react chemically with each other at the electrolyte membrane 10a, thereby generating voltages between the fuel poles 10b and the oxidizer poles 10c. The sum of the voltages produced at the electromotive portions 11 is the final output voltage of the fuel cell A.

Next, it will be explained how the concentration distribution of fuel in the conventional liquid holding sheet 200a and that of fuel in the liquid holding sheet 20a in the first embodiment vary with the passage of time, with reference to FIGS. 2A to 2D and 12A to 12D.

First, the liquid holding sheet 20a in the first embodiment will be explained.

Figure 2A:
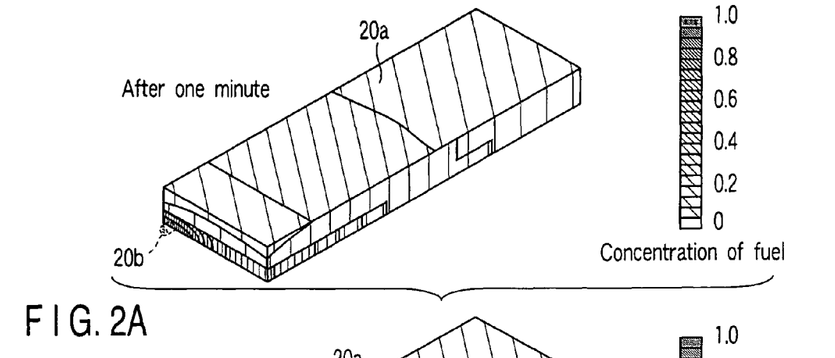
FIG. 2A is a perspective view of a liquid holding sheet in the first embodiment as viewed from an electromotive layer side, for showing the concentration distribution of fuel in the liquid holding sheet, which is obtained one minute after replenishing the liquid holding sheet with fuel.
Figure 2B:
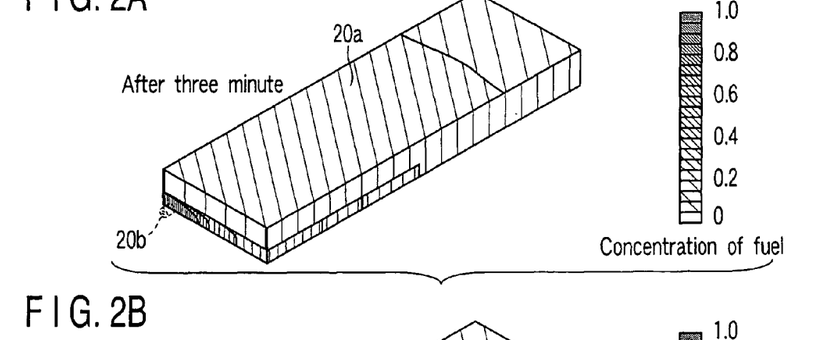
FIG. 2B is a perspective view of the liquid holding sheet in the first embodiment as viewed from the electromotive layer side, for showing the concentration distribution of fuel in the liquid holding sheet, which is obtained three minutes after replenishing the liquid holding sheet with fuel.
Figure 2C:
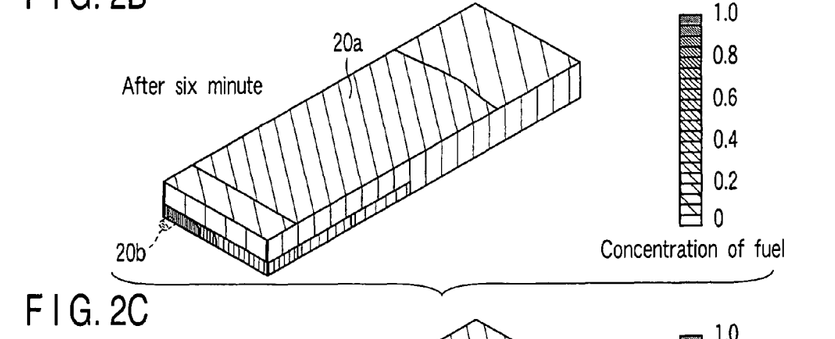
FIG. 2C is a perspective view of the liquid holding sheet in the first embodiment as viewed from the electromotive layer side, for showing the concentration distribution of fuel in the liquid holding sheet, which is obtained six minutes after replenishing the liquid holding sheet with fuel.
Figure 2D:
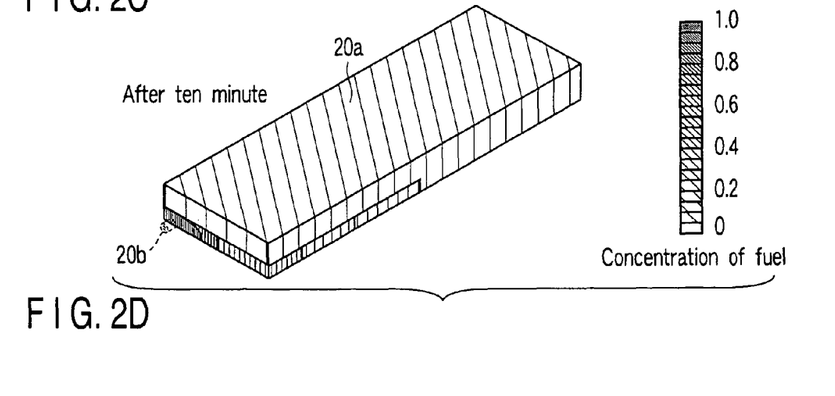
FIG. 2D is a perspective view of the liquid holding sheet in the first embodiment as viewed from the electromotive layer side, for showing the concentration distribution of fuel in the liquid holding sheet, which is obtained ten minutes after replenishing the liquid holding sheet with fuel.

FIG. 2A is a perspective view of the liquid holding sheet 20a in the first embodiment as viewed from the electromotive layer side, for showing the distribution of the fuel concentration of the liquid holding sheet 20a, which is obtained one minute after replenishing the liquid holding sheet 20a with fuel. FIG. 2B is a perspective view of the liquid holding sheet 20a as viewed from the electromotive layer side, for showing the distribution of the fuel concentration of the liquid holding sheet 20a, which is obtained three minutes after replenishing the liquid holding sheet 20a with fuel. FIG. 2C is a perspective view of the liquid holding sheet 20a as viewed from the electromotive layer side, for showing the distribution of the fuel concentration of the liquid holding sheet 20a, which is obtained six minutes after replenishing the liquid holding sheet 20a with fuel. FIG. 2D is a perspective view of the liquid holding sheet 20a as viewed from the electromotive layer side, for showing the distribution of the fuel concentration of the liquid holding sheet 20a, which is obtained ten minutes after replenishing the liquid holding sheet 20a with fuel.

It can be seen from FIG. 2A that one minute after the liquid holding sheet 20a is replenished with fuel, the fuel concentration of a surface of the liquid holding sheet 20a which is located on the electromotive layer 10 (i.e., that of an upper surface of the liquid holding sheet 20a in FIG. 2A) is approximately 35 to 45% of that of part of the liquid holding sheet 20a which is close to the replenishing portion 20b, and the fuel concentration of part of the surface of the liquid holding sheet 20a, which has the highest fuel concentration, is approximately 1.3 times higher than that of another part of the surface of the liquid holding sheet 20a, which has the lowest fuel concentration.

It can be seen from FIG. 2D that ten minutes after the liquid holding sheet 20a is replenished with fuel, the fuel concentration of the above surface of the liquid holding sheet 20a which is located on the electromotive layer 10 (i.e., that of the upper surface of the liquid holding sheet 20a in FIG. 2D) is approximately 72 to 74% of that of the above part of the liquid holding sheet 20a which is close to the replenishing portion 20b, and the fuel concentration of part of the surface of the liquid holding sheet 20a, which has the highest fuel concentration, is approximately 1.03 times higher than that of another part of the surface of the liquid holding sheet 20a, which has the lowest fuel concentration. That is, the difference between the highest fuel concentration and the lowest fuel concentration is decreased.

In such a manner, it can be seen that in the first embodiment, ten minutes after the liquid holding sheet 20a is replenished with fuel, the concentration of the fuel in the surface of the liquid holding sheet 20a which is located on the electromotive layer 10 is substantially uniform.

Next, the conventional liquid holding sheet 200a will be explained.

Figures 12A, 12B:
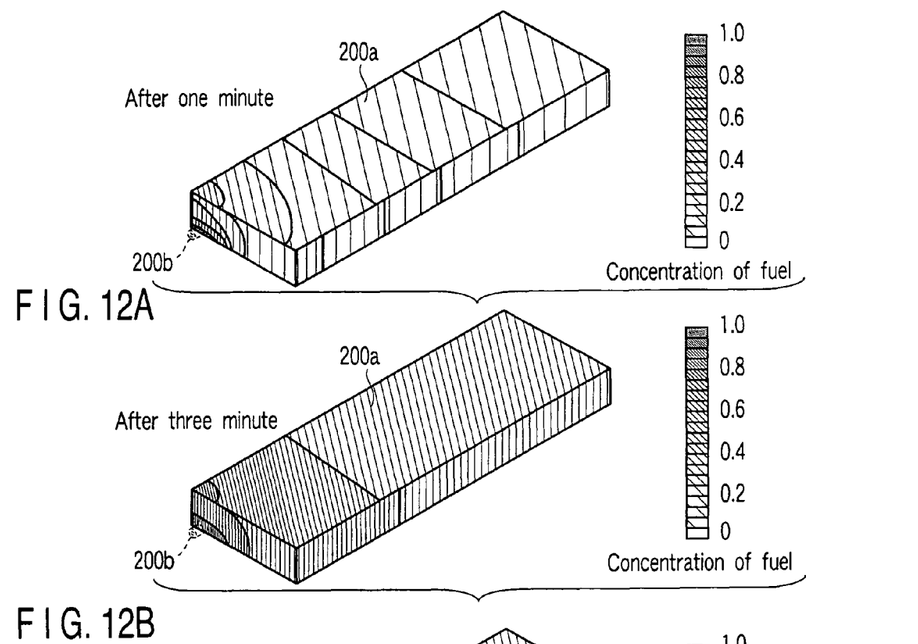
FIG. 12A is a perspective view of a conventional liquid holding sheet as viewed from an electromotive layer side, for showing the concentration distribution of fuel in the liquid holding sheet, which is obtained one minute after replenishing the liquid holding sheet with fuel.
FIG. 12B is a perspective view of the conventional liquid holding sheet as viewed from the electromotive layer side, for showing the concentration distribution of fuel in the liquid holding sheet, which is obtained three minutes after replenishing the liquid holding sheet with fuel.
Figure 12C:
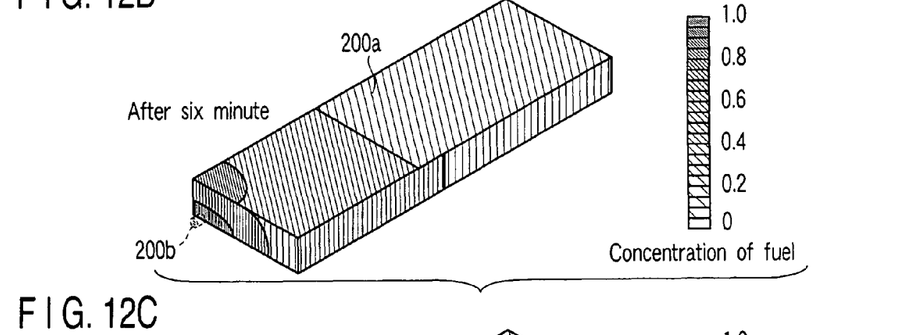
FIG. 12C is a perspective view of the conventional liquid holding sheet as viewed from the electromotive layer side, for showing the concentration distribution of fuel in the liquid holding sheet, which is obtained six minutes after replenishing the liquid holding sheet with fuel.
Figure 12D:
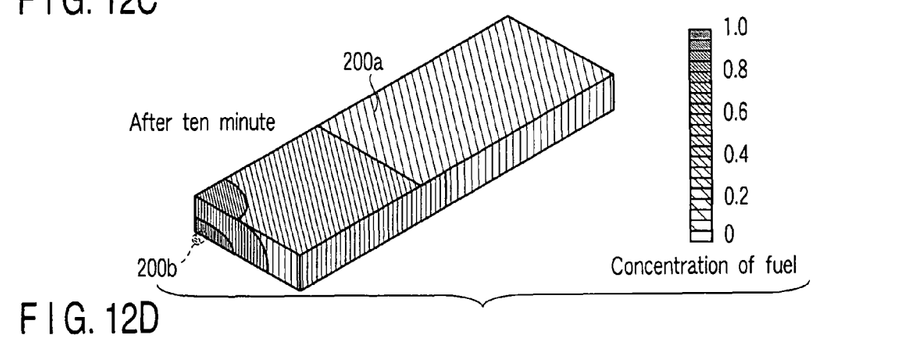
FIG. 12D is a perspective view of the conventional liquid holding sheet as viewed from the electromotive layer side, for showing the concentration distribution of fuel in the liquid holding sheet, which is obtained ten minutes after replenishing the liquid holding sheet with fuel.

FIG. 12A is a perspective view of the conventional liquid holding sheet 20a as viewed from the electromotive layer side, for showing the concentration distribution of the fuel in the liquid holding sheet 200a, which is obtained one minute after replenishing the liquid holding sheet 200a with fuel. FIG. 12B is a perspective view of the liquid holding sheet 200a as viewed from the electromotive layer side, for showing the concentration distribution of the fuel in the liquid holding sheet 200a, which is obtained three minutes after replenishing the liquid holding sheet 200a with fuel. FIG. 12C is a perspective view of the liquid holding sheet 200a as viewed from the electromotive layer side, for showing the concentration distribution of the fuel in liquid holding sheet 200a, which is obtained six minutes after replenishing the liquid holding sheet 200a with fuel. FIG. 12D is a perspective view of the liquid holding sheet 200a as viewed from the electromotive layer side, for showing the concentration distribution of the fuel in the liquid holding sheet 200a, which is obtained ten minutes after replenishing the liquid holding sheet 200a with fuel.

It can be seen from FIG. 12A that one minute after the liquid holding sheet 200a is replenished with fuel, the fuel concentration of a surface of the liquid holding sheet 200a which is located on the electromotive layer 100 (i.e., that of an upper surface of the liquid holding sheet 200a in FIG. 12A) is approximately 45 to 85% of that of part of the liquid holding sheet 20a which is close to the replenishing portion 200b, and the fuel concentration of part of the surface of the liquid holding sheet 200a, which has the highest fuel concentration, is approximately 1.8 times higher than that of another part of the surface of the liquid holding sheet 20a, which has the lowest fuel concentration.

It can be seen from FIG. 12D that ten minutes after the liquid holding sheet 200a is replenished with fuel, the fuel concentration of the above surface of the liquid holding sheet 200a which is located on the electromotive layer 100 (i.e., that of the upper surface of the liquid holding sheet 200a in FIG. 12D) is approximately 80 to 95% of that of the above part of the liquid holding sheet 200a which is close to the replenishing portion 200b, and the fuel concentration of part of the surface of the liquid holding sheet 200a, which has the highest fuel concentration, is approximately 1.2 times higher than that of another part of the surface of the liquid holding sheet 200a, which has the lowest fuel concentration. That is, the difference between the highest fuel concentration and the lowest fuel concentration is still great.

In such a manner, it can be seen that in the conventional liquid holding sheet 200a, the fuel concentration of the above part of the surface of the liquid holding sheet 200a, which is located on the electromotive layer 100, i.e., the highest fuel concentration, is approximately 1.2 times higher than that of the above other part of the surface of the liquid holding sheet 200a, i.e., the lowest fuel concentration, even when ten minutes lapse after replenishing the liquid holding sheet 200a with fuel, that is, the difference between the highest fuel concentration and the lowest fuel concentration is still great, even when ten minutes lapse after replenishing the liquid holding sheet 200a with fuel.

It is demonstrated from the above that the fuel concentration of the surface of the liquid holding sheet 20a which is located on the electromotive layer 10 is more easily made uniform than that of the conventional liquid holding sheet 200a.

Therefore, when the liquid holding sheet 20a according to the present invention is applied, substantially the same amount of fuel, which enables electrical energy to be produced at the highest efficiency, can be supplied to the electromotive portions 11 by adjusting the sizes or arrangement of the openings 21.

Figure 3:
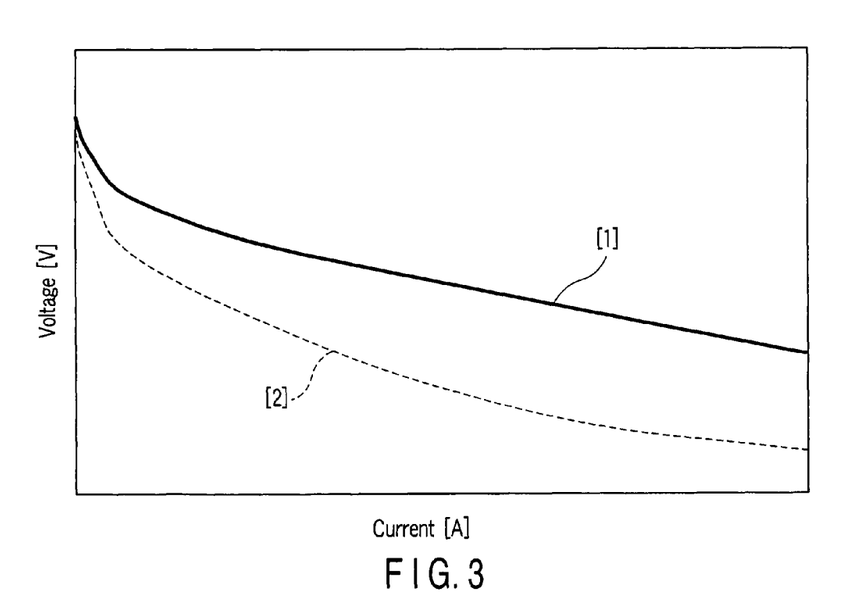
FIG. 3 is a graph for showing current-voltage characteristics of the fuel cell according to the first embodiment and those of a conventional fuel cell.

FIG. 3 is a graph for showing current-voltage characteristics of the fuel cell A according to the first embodiment and those of the conventional fuel cell B, which are indicated by "[1]" and "[2]", respectively in FIG. 3.

As can be seen from FIG. 3, the fuel cell A according to the first embodiment can obtain a voltage higher than that in the conventional fuel cell B. This is because as described above, in the first embodiment, the voltage is produced by using fuel the amount of which is set to enable electrical energy to be produced at the highest efficiency by the electromotive portions 11.

In the fuel cell A having the above structure, the fuel adjusting film 20c is provided as an impervious film which isolates the electromotive layer 10 and the replenishing portion 20b from each other. The openings 21 are formed to have different sizes, and are arranged in ascending order of size from the ones closest to the replenishing portion 20b.

By virtue of the above structure, when fuel with which the liquid holding sheet 20a is replenished passes through the openings 21, the fuel concentration of the surface of the liquid holding sheet 20a, which is close to the electromotive layer 10, is made uniform over the surface, thus improving the efficiency of production of electrical energy by the fuel cell A. Accordingly, the number of electromotive portions 11 and the amount of fuel, which are necessary for generating desired electrical energy, can be reduced. Thus, the fuel cell A can be made smaller.

Second Embodiment

Next, a second embodiment of the present invention will be explained with reference to FIG. 4. In the second embodiment, explanations of the same structural features and operations as in the first embodiment will be omitted.

Figure 4:
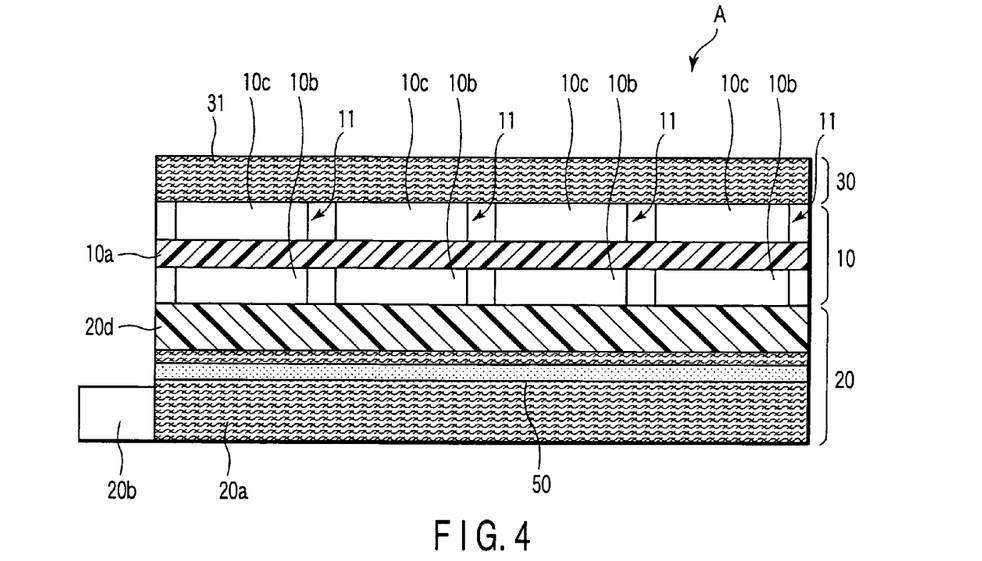
FIG. 4 is a vertical sectional view of a fuel cell according to a second embodiment of the present invention.

FIG. 4 is a vertical sectional view of a fuel cell A according to the second embodiment.

As shown in FIG. 4, the fuel cell A according to the second embodiment comprises a fuel adjusting film 50 formed of porous material, instead of the fuel adjusting film 20c (impervious film) according to the first embodiment. The fuel adjusting film 50 is provided in the liquid holding sheet 20a in substantially parallel with the electromotive layer 10, and the porosity of the fuel adjusting film 50 gradually increases in a direction away from the replenishing portion 20b.

In the above structure also, the further the fuel with which the replenishing sheet 20a is replenished is from the replenishing portion 20b, the more easily it advances toward the electromotive layer 10. Thus, the fuel concentration of the surface of the liquid holding sheet 20a, which is close to the electromotive layer 10, is made uniform over the surface. As a result, substantially the same amount of fuel is supplied to the fuel poles 10b, thus improving the efficiency of production of electrical energy by the fuel cell A.

Third Embodiment

Next, a third embodiment of the present invention will be explained with reference to FIG. 5. With respect to the third embodiment, explanations of the same structural features and operations as in the first and second embodiments will be omitted.

Figure 5:
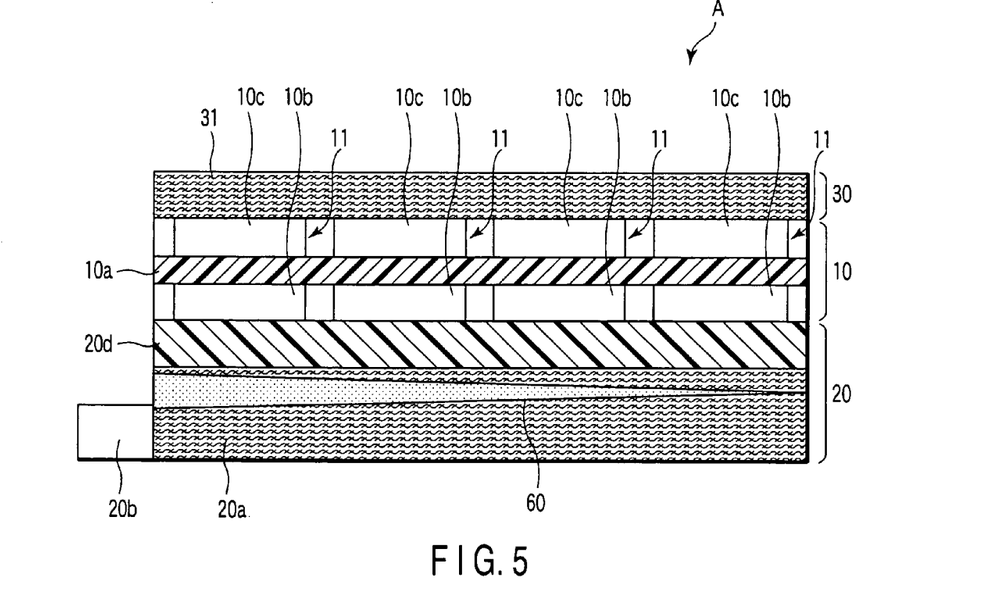
FIG. 5 is a vertical sectional view of a fuel cell according to a third embodiment of the present invention.

FIG. 5 is a vertical sectional view of a fuel cell A according to the third embodiment.

As shown in FIG. 5, the fuel cell A according to the third embodiment comprises a fuel adjusting film 60 formed of porous material as in the second embodiment. However, unlike the second embodiment, the porosity of the fuel adjusting film 60 is uniform from one end thereof to the other end, i.e., it does not vary, and the thickness of the fuel adjusting film 60 gradually decreases in a direction away from the replenishing portion 20b.

In this structure also, the further the fuel with which the replenishing sheet 20a is replenished is from the replenishing portion 20b, the more easily it advances toward the electromotive layer 10. Thus, the fuel concentration of the surface of the liquid holding sheet 20a, which is close to the electromotive layer 10, is made uniform over the surface. As a result, substantially the same amount of fuel is supplied to the fuel poles 10b, thus improving the efficiency of production of electrical energy by the fuel cell A.

Fourth Embodiment

Next, a fourth embodiment of the present invention will be explained with reference to FIG. 6. With respect to the fourth embodiment, explanations of the same structural features and operations as in the first to third embodiments will be omitted.

Figure 6:
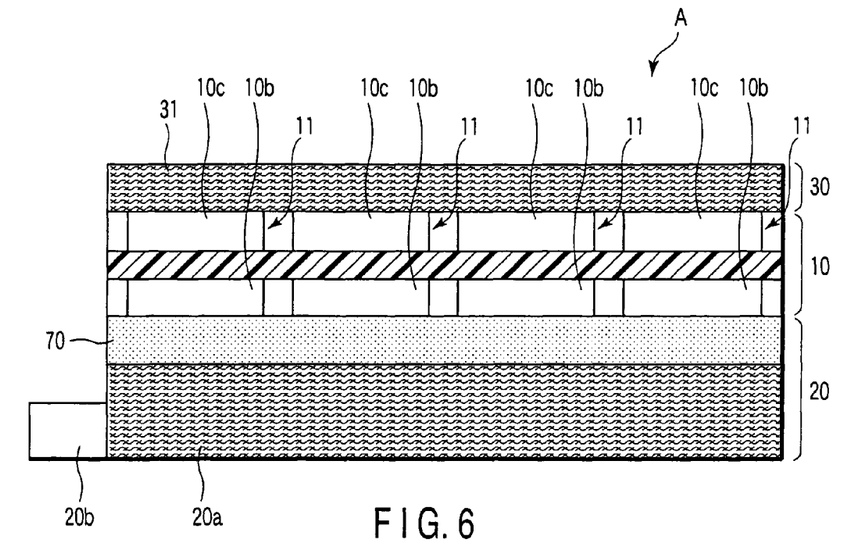
FIG. 6 is a vertical sectional view of a fuel cell according to a fourth embodiment of the present invention.

FIG. 6 is a vertical sectional view of a fuel cell A according to the fourth embodiment.

As shown in FIG. 6, the fuel cell A according to the fourth embodiment includes a fuel diffusion film 70 formed of porous material, in place of the fuel adjusting films 20c, 50 and 60 respectively according to the first to third embodiments. The porosity of the fuel diffusion film 70 gradually increases in a direction away from the replenishing portion 20b.

In this structure also, substantially the same amount of fuel is supplied to the fuel poles 10b, thus improving the efficiency of production of electrical energy by the fuel cell A. In addition, if the fuel diffusion film of the conventional fuel cell is replaced by the fuel diffusion film 70 of the fourth embodiment, the conventional fuel cell can be efficiently used, and the manufacturing cost is not increased.

It should be noted that the fuel cell A according to the fourth embodiment, as described above, includes the fuel diffusion layer 70 in place of the fuel adjusting films 20c, 50 and 60 respectively according to the first to third embodiments; however, it may include both the fuel diffusion layer 70 and any of the fuel adjusting films 20c, 50 and 60.

Fifth Embodiment

Next, a fifth embodiment of the present invention will be explained with reference to FIG. 7. With respect to the fifth embodiment, explanations of the same structural features and operations as in the first to fourth embodiments will be omitted.

Figure 7:
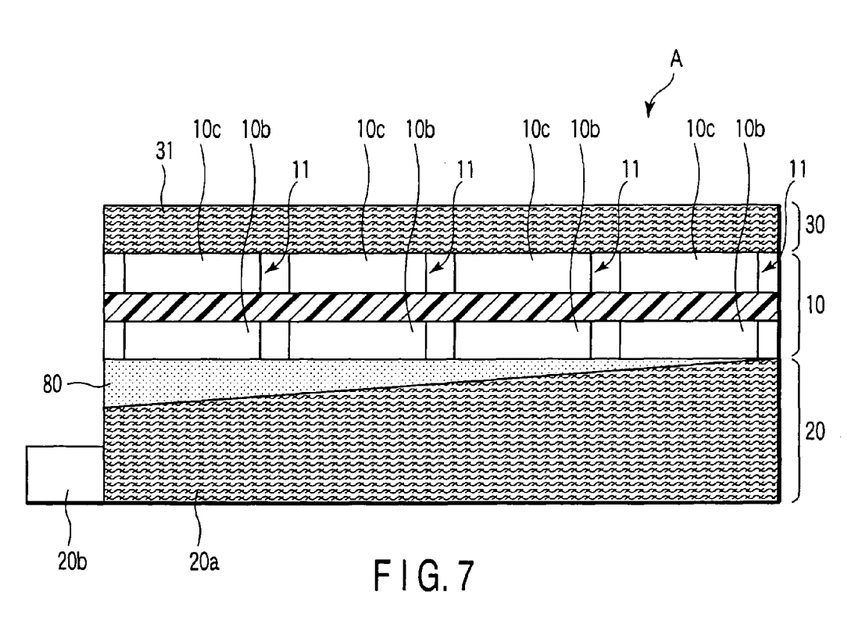
FIG. 7 is a vertical sectional view of a fuel cell according to a fifth embodiment of the present invention.

FIG. 7 is a vertical sectional view of a fuel cell A according to the fifth embodiment.

As shown in FIG. 7, the fuel cell A according to the fifth embodiment includes a fuel diffusion film 80 formed of porous material, in place of the fuel adjusting films 20c, 50 and 60 respectively according to the first to third embodiments, as in the fourth embodiment. However, unlike the fourth embodiment, the porosity of the fuel diffusion film 80 according to the fifth embodiment is uniform throughout the fuel diffusion film 80, and the thickness of the fuel diffusion film 80 decreases in a direction away from the replenishing portion 20b.

In this structure also, the same amount of fuel is supplies to the fuel poles 10b, thus improving the efficiency of production of electrical energy by the fuel cell A.

Furthermore, the fuel cell A according to the fifth embodiment includes the fuel diffusion film 80 in place of the fuel adjusting films 20c, 50 and 60 respectively according to the first to third embodiments; however, it may include both the fuel diffusion film 80 and any of the fuel adjusting films 20c, 50 and 60.

Sixth Embodiment

Next, a sixth embodiment of the present invention will be explained with reference to FIGS. 8 and 9. With respect to the sixth embodiment, explanations of the same structural features and operations as in the first to fifth embodiments will be omitted.

Figure 8:
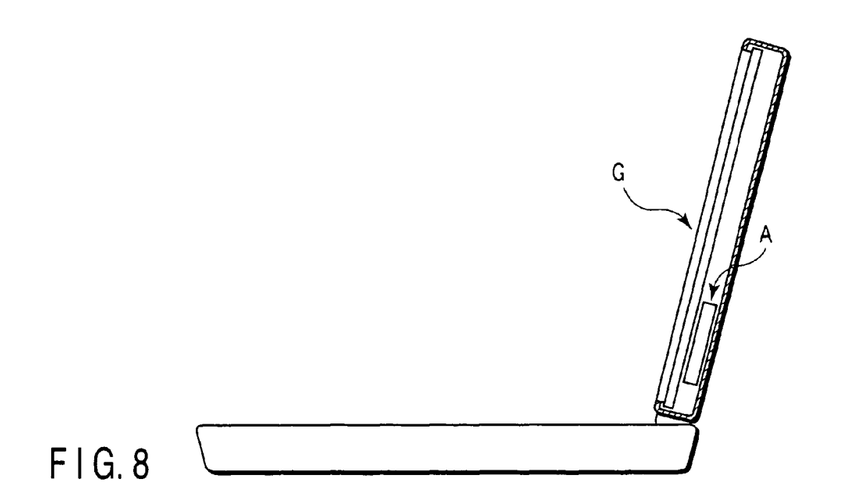
FIG. 8 is a vertical sectional view of a notebook computer incorporating a fuel cell according to a sixth embodiment of the present invention.
Figure 9:
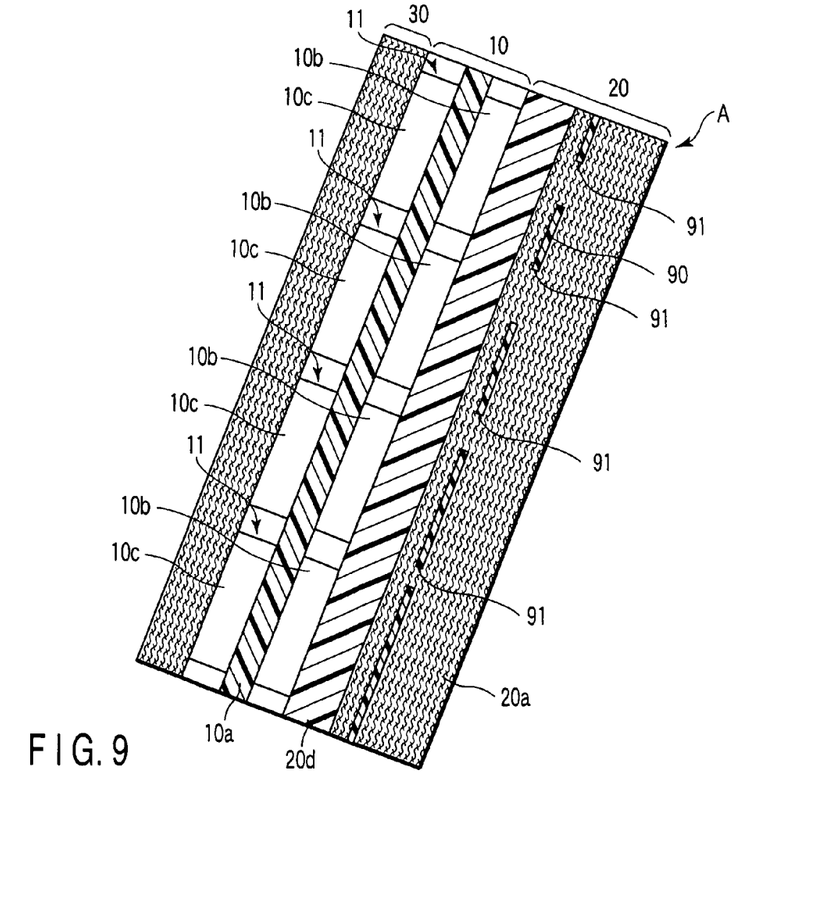
FIG. 9 is a vertical sectional view of the fuel cell according to the sixth embodiment of the present invention.

FIG. 8 is a vertical sectional view of a notebook computer incorporating a fuel cell A according to the sixth embodiment of the present invention, and FIG. 9 is a vertical sectional view of the fuel cell A according to the sixth embodiment.

As shown in FIGS. 8 and 9, it is assumed that the fuel cell A according to the sixth embodiment is provided in a housing of the notebook computer, and the notebook computer is used, with the housing inclined relative to the horizontal, as a result of which the fuel cell A is inclined, and the electromotive portions 11 are also inclined, relative to the horizontal. If the fuel cell A is inclined, fuel in the liquid holding sheet 20a easily advances downwards and stays in a lower side portion of the liquid holding sheet 20a due to gravity. As a result, the fuel concentration of the lower side portion of the liquid holding sheet 20a is high, and that of an upper side portion of the liquid holding sheet 20a is low.

In the fuel cell A according to the sixth embodiment, the liquid holding sheet 20a includes a fuel adjusting film 90 formed of an impervious film which does not permit fuel to pass therethrough, as in the first embodiment. However, unlike the first embodiment, the fuel adjusting film 90 includes a plurality of openings 91 which have different sizes, and which are arranged in ascending order of size toward the upper side portion of the liquid holding portion 20a.

By virtue of the above structural feature, the closer the fuel in the liquid holding sheet 20a to the upper side portion of the liquid holding portion 20a, the more easily it advances toward the electromotive portion side. Thus, the fuel cell A is provided in a rear surface portion, etc. of the above housing of the notebook computer, which is located opposite to a display screen G of the notebook computer, and even when the housing of the notebook computer is inclined, and the fuel cell A is also inclined, the fuel concentration of the surface of liquid holding portion 20a, which is close to the electromotive portions 11, is made uniform. As a result, substantially the same amount of fuel is supplied to the fuel poles 10b, thereby improving the efficiency of production of electrical energy by the fuel cell A.

In the sixth embodiment, the fuel adjusting film 90, as described above, is formed of an impervious film including the openings 91 having different sizes. However, the fuel adjusting film of the sixth embodiment is not limited to the above fuel adjusting film 90. That is, an adjusting film may be used which is formed of porous material whose porosity gradually increases toward the upper side portion of the liquid holding sheet 20a, or an adjusting film may be used which is formed of porous material whose thickness gradually decreases toward the upper side portion of the liquid holding sheet 20a.

Furthermore, between the liquid holding sheet 20a and the electromotive layer 10, instead of the fuel adjusting film, any of the following fuel diffusion films may be provided: a fuel diffusion film which is formed of porous material whose porosity gradually increases toward the upper side portion of the liquid holding sheet 20a; and a fuel diffusion film which is formed of porous material whose thickness gradually decreases toward the upper side portion of the liquid holding sheet 20a.

Seventh Embodiment

Next, a seventh embodiment of the present invention will be explained with reference to FIGS. 10 and 11. With respect to the seventh embodiment, explanations of the same structural features and operations as in the first to sixth embodiments will be omitted.

Figure 10:
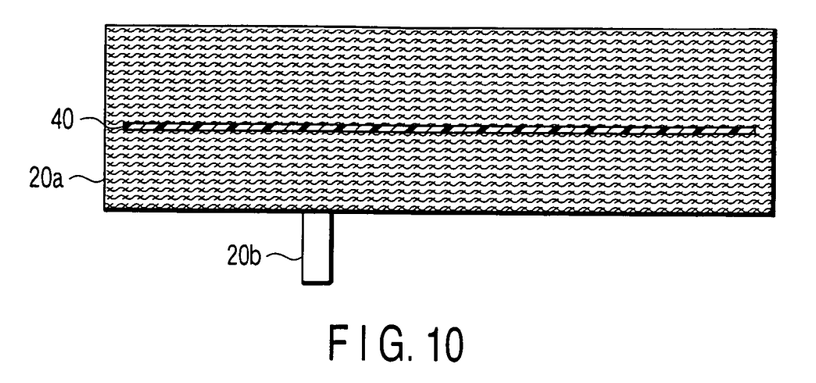
FIG. 10 is a vertical sectional view of a liquid holding sheet in a seventh embodiment of the present invention.
Figure 11:
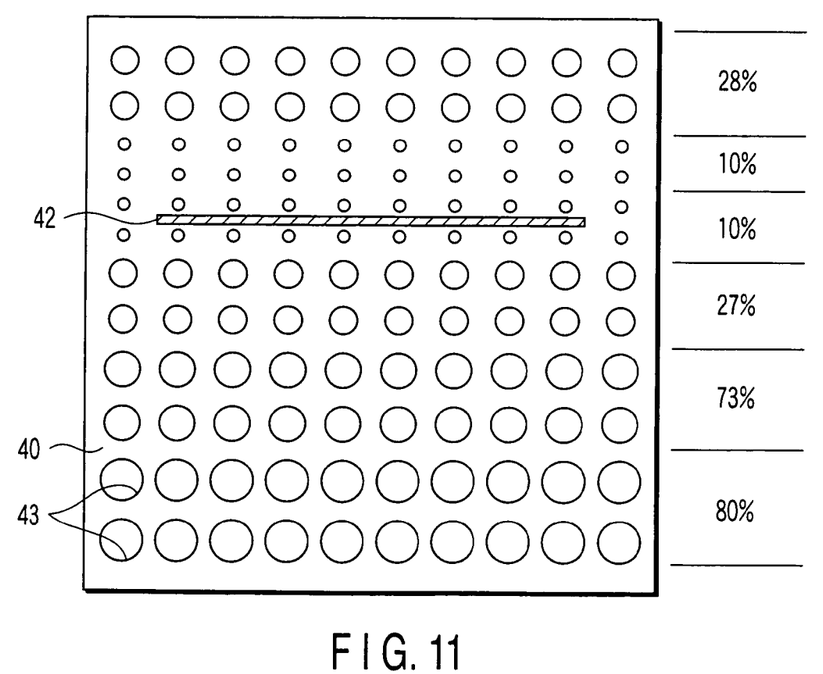
FIG. 11 is a schematic view showing the aperture ratios of parts of a fuel adjusting film in the seventh embodiment of the present invention.

FIG. 10 is a vertical sectional view of the liquid holding sheet 20a in the seventh embodiment, and FIG. 11 is a schematic view showing the aperture ratios of parts of the fuel adjusting film 40 in the seventh embodiment.

As shown in FIG. 10, in the seventh embodiment, the replenishing portion 20b is connected to an intermediate portion of a surface of the liquid holding sheet 20a, not the side end portion thereof. Thus, fuel from the replenishing portion 20b is supplied from a region 42, which is hatched in FIG. 11, to the liquid holding sheet 20a. The region 42 functions as a fuel supplying area.

The fuel adjusting film 40 includes a plurality of openings 43 for allowing fuel with which the liquid holding sheet 20a is replenished to advance toward the electromotive portions 11.

The openings 43 are arranged in ascending order of size from the ones closest to the fuel supplying area 42, i.e., they are arranged in descending order in size from openings 43 located furthest from the fuel supplying area 42. That is, the aperture ratio is set in such a way as to gradually increase in a direction away from the fuel supplying area side.

It should be noted that the numerals indicated in FIG. 11 denote the aperture ratios of regions each of which is located between imaginary lines extending from two associated lines. For example, "28%" denotes the aperture ration of a region located between imaginary lines extending from two associated lines. To be more specific, of the above regions, a region located closest to the fuel supplying region 42 has an aperture ratio of approximately 10%, and a region located furthest from the fuel supplying region 42 has an aperture ratio of approximately 80%.

When the fuel adjusting film 40 having the above structure is used, the fuel concentration of a surface portion of the liquid holding sheet 20a, which is close to the electromotive portions 11, is made uniform over the surface portion, thus enabling substantially the same amount of fuel to advance to the electromotive portions 11.

The present invention is not limited to the above embodiments only. When it is put to practical use, a desired one or ones of the structural elements disclosed with respect to the above embodiments may be modified without departing from the subject matter of the present invention. Further, various inventions can be achieved by appropriately combining desired ones of the structural elements of the embodiments. For example, some of the structural elements in a desired one or ones of the embodiments may be deleted, or structural elements in a desired one or ones of the embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell comprising:
a plurality of electromotive portions which cause fuel and oxygen to react chemically with each other to produce electrical energy;
a first sheet which is formed of a felt material and which has a major surface from which fuel is supplied to the plurality of electromotive portions;
a second sheet which supplies the oxygen to the plurality of electromotive portions;
a replenishing portion which is provided at a predetermined portion of the first sheet, and replenishes the first sheet with the fuel; and
a fuel adjusting film which is inserted in the first sheet, is opposed to the electromotive portions such that a part of the first sheet is interposed between the fuel adjusting film and the electromotive portions, and adjusts amounts of the fuel to be supplied from the first sheet to the plurality of electromotive portions, such that the amounts of the fuel are made uniform over said major surface of the first sheet, wherein the fuel adjusting film is an impervious film having openings which are arranged in ascending order of size from one of the openings located closest to the replenishing portion.

2. A fuel cell comprising:

a plurality of electromotive portions which cause fuel and oxygen to react chemically with each other to produce electrical energy;

a first sheet which is formed of a felt material and which has a major surface from which fuel is supplied to the plurality of electromotive portions;

a second sheet which supplies the oxygen to the plurality of electromotive portions;

a replenishing portion which is provided at a predetermined portion of the first sheet, and replenishes the first sheet with the fuel; and a fuel adjusting film which is inserted in the first sheet, is opposed to the electromotive portions such that a part of the first sheet is interposed between the fuel adjusting film and the electromotive portions, and adjusts amounts of the fuel to be supplied from the first sheet to the plurality of electromotive portions, such that the amounts of the fuel are made uniform over said major surface of the first sheet, wherein the fuel adjusting film is formed of porous material whose thickness gradually decreases in a direction away from the replenishing portion.

3. A fuel cell comprising:

a plurality of electromotive portions which cause fuel and oxygen to react chemically with each other to produce electrical energy;

a first sheet which is formed of a felt material and which has a major surface from which fuel is supplied to the plurality of electromotive portions;

a second sheet which supplies the oxygen to the plurality of electromotive portions;

a replenishing portion which is provided at a predetermined portion of the first sheet, and replenishes the first sheet with the fuel; and a fuel adjusting film which is inserted in the first sheet, is opposed to the electromotive portions such that a part of the first sheet is interposed between the fuel adjusting film and the electromotive portions, and adjusts amounts of the fuel to be supplied from the first sheet to the plurality of electromotive portions, such that the amounts of the fuel are made uniform over said major surface of the first sheet, wherein the fuel adjusting film is formed of porous material whose porosity gradually increases in a direction away from the replenishing portion.

* * * * *